United States Patent [19]
Quick

[11] 3,828,531
[45] Aug. 13, 1974

[54] VORTEX FAN MEANS FOR A CROP GATHERING APPARATUS

[75] Inventor: Graeme R. Quick, Ames, Iowa

[73] Assignee: Iowa State University Research Foundation, Ames, Iowa

[22] Filed: Mar. 14, 1969

[21] Appl. No.: 807,341

[52] U.S. Cl. .................. 56/12.9, 56/158, 56/219
[51] Int. Cl. ........................................ A01d 45/20
[58] Field of Search .......... 56/202, 188, 23; 415/54; 239/146, 148, 505

[56] References Cited
UNITED STATES PATENTS

| | | | |
|---|---|---|---|
| 3,096,931 | 7/1963 | Eck | 415/148 X |
| 3,165,874 | 1/1965 | Osteen | 56/23 |
| 3,306,526 | 2/1967 | Laing | 415/54 |
| 3,322,333 | 5/1967 | Laing | 415/54 |
| 3,441,201 | 4/1969 | Hollenberg | 415/148 X |

Primary Examiner—Robert Peshock
Attorney, Agent, or Firm—Zarley, McKee, Thomte & Voorhees

[57] ABSTRACT

A vortex fan means for a crop gathering apparatus such as a combine or the like. The fan means extends across the forward end of the combine at a position forwardly and above the combine header assembly. The fan means includes a housing partially extending around the fan rotor assembly and has a discharge opening formed in its lower rearward end. The fan means directs air downwardly and rearwardly towards the sickle bar of the header assembly to cause the standing crop to be bent over the sickle bar to improve the cutting action thereof and to aid in the feeding action on the platform.

1 Claim, 4 Drawing Figures

PATENTED AUG 13 1974　3,828,531

INVENTOR
GRAEME R. QUICK
BY
Zarley, McKee & Thomte
ATTORNEYS

VORTEX FAN MEANS FOR A CROP GATHERING APPARATUS

This invention pertains to a fan means for a crop gathering apparatus such as a combine or the like and more particularly to a fan means of the vortex type adapted to improve the cutting action of the header assembly of the combine and to aid the feeding action on the platform. It can be appreciated that it is extremely desirable to cause the combine to efficiently cut a standing crop to provide the maximum crop yield. Such efficiency is extremely desirable in test plots so as to be able to accurately determine the yield thereof.

Blowers have been provided for combines and were positioned forwardly of the header assembly in an attempt to blow the crop onto the combine platform after the same has been cut by the sickle bar assembly. Those apparatuses presently available are comprised of conventional blowers or fan means and are extremely large and cumbersome to mount on the combine. The conventional apparatuses are also limited in width which requires several fans to be needed on wide machines to permit air to be drawn in the side inlets to the rotor. Those large blowers were not only difficult to mount on the combine due to their large size but also created a serious visibility problem for the combine operator. Additionally, the blowers heretofore available required an extreme amount of power to operate the same and the blowers did not provide a uniform flow of air across the width of the header assembly. The vortex fan means of this invention is designed to overcome the inefficiency, large size and large power requirement of the devices heretofore available and to eliminate the width limitations thereof.

Therefore, it is a principal object of this invention to provide a vortex fan means for a crop gathering apparatus such as a combine or the like.

A further object of this invention is to provide a vortex fan means for a crop gathering apparatus which requires a minimum of power to operate.

A further object of this invention is to provide a vortex fan means for a crop gathering apparatus which is compact in design.

A further object of this invention is to provide a vortex fan means for a crop gathering apparatus which provides a uniform air flow across the width of the header assembly.

A further object of this invention is to provide a vortex fan means for a crop gathering apparatus which reduces the power requirements such as were required for conventional centrifugal fans.

A further object of this invention is to provide a vortex fan means for a crop gathering apparatus which eliminates the need for a reel from the apparatus.

A further object of this invention is to provide a vortex fan means for a crop gathering apparatus which improves the crop gathering efficiency thereof.

A further object of this invention is to provide a vortex fan means for a crop gathering apparatus which is safe to operate.

A further object of this invention is to provide a vortex fan means for a crop gathering apparatus which eliminates the need of a platform auger and front elevator.

A further object of this invention is to provide a vortex fan means for a crop gathering apparatus which has a means thereon for adjusting the air discharge therefrom to enable the apparatus to be used in "high" or "low" cutting operations.

A further object of this invention is to provide a vortex fan means for a crop gathering apparatus which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
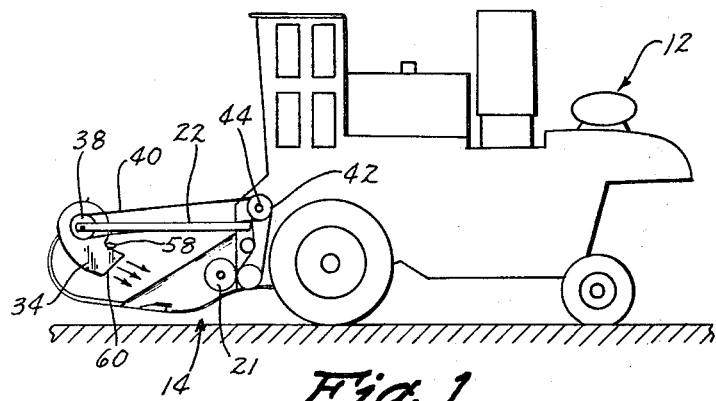
FIG. 1 is a side elevational view of a combine having the vortex fan means mounted thereon with portions thereof cut away to more fully illustrate the invention.

The vortex fan means of this invention is generally designated by the reference numeral 10 and is designed for use on a crop gathering apparatus such as a combine 12 illustrated in FIG. 1. It should be noted that the fan means of this invention could also be used on any other crop gathering apparatus where it is desirable to aid in the cutting action of a sickle bar assembly such as a swathing machine.

Combine 12 includes a header assembly 14 mounted on its forward end which is seen to include a platform 16 and sickle bar assembly 20. The numeral 21 designates a conventional thresher cylinder. The platform 16 is raised or lowered with respect to the ground in conventional fashion and the sickle bar assembly 20 is powered in conventional fashion.

Figure 2:
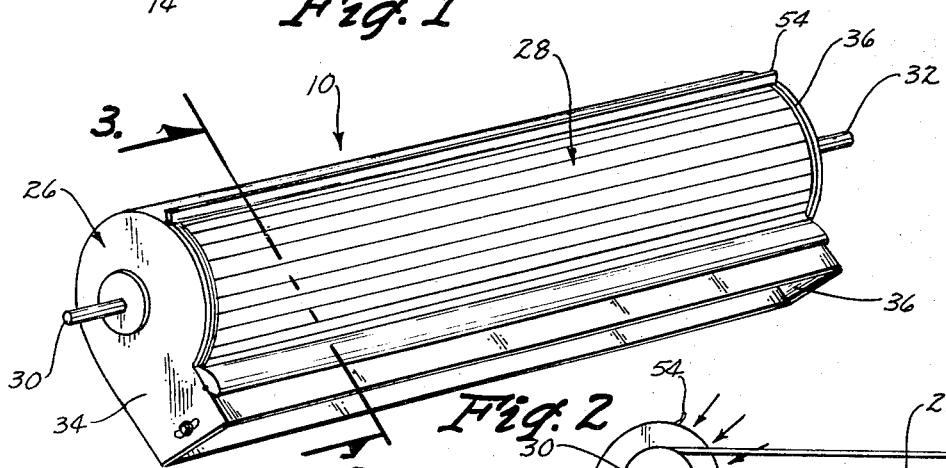
FIG. 2 is a rear perspective view of the vortex fan means of this invention.

A pair of support arms 22 and 24 (not shown) are secured to the combine and extend forwardly therefrom as partially illustrated in FIG. 1. The fan means 10 of this invention is mounted on and supported on the forward ends of the support arms 22 and 24. Fan means 10 includes a housing 26 having a rotor means 28 rotatably mounted therein as illustrated in FIG. 2. Shafts 30 and 32 are secured to the opposite ends of the rotor 28 and extend outwardly through sides 34 and 36 respectively of the housing 26. Shafts 30 and 32 are rotatably mounted in the outer ends of the arms 22 and 24 respectively and shaft 30 is provided with a belt pulley 38 mounted thereon. A belt 40 extends around pulley 38 and also extends around a pulley 42 which is rotated by a suitable drive shaft 44 such as the cylinder shaft or the like. Fan means 10 can also be powered by a hydraulic motor mounted on the end of shaft 30.

Figure 3:
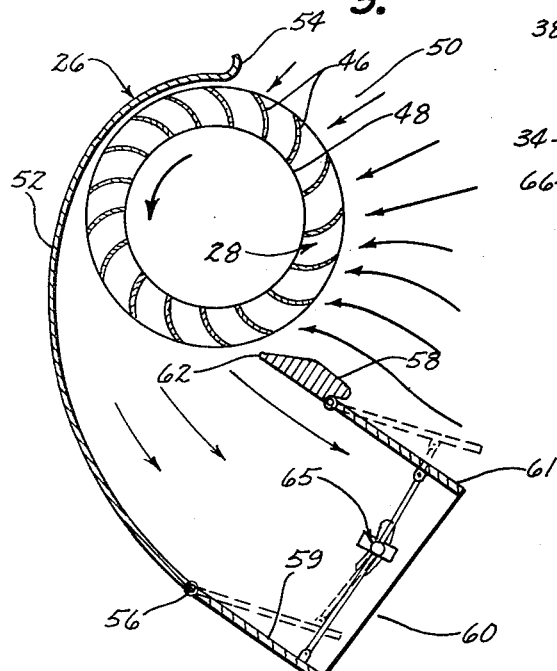
FIG. 3 is an enlarged sectional view as seen along lines 3—3 of FIG. 2.
Figure 4:
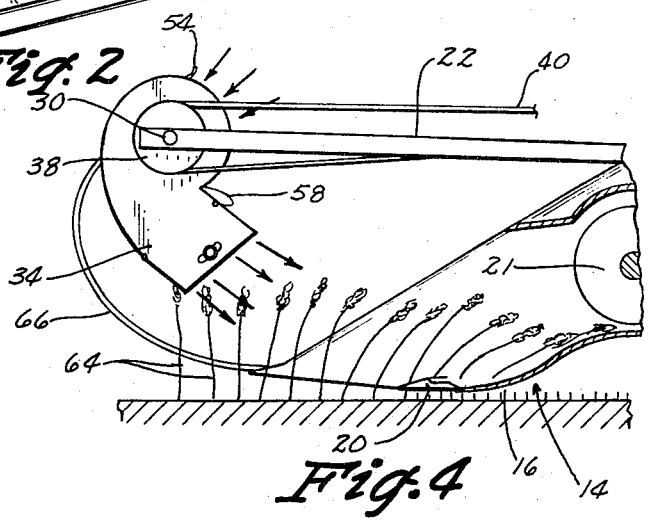
FIG. 4 is a fragmentary side elevational view of the vortex fan means illustrating the operation of the same with portions thereof cut away to more fully illustrate the invention.

As seen in FIG. 3, rotor 28 includes a plurality of curved vanes 46 secured at their inner ends to a support member 48. Housing 28 is provided with an air intake opening 50 at its upper rearward end as best illustrated in FIG. 3. As also illustrated in FIG. 3, housing 26 includes a front wall member 52 having an upper end 54 and a lower rearward end 56. FIG. 3 illustrates the fact that the space between the rotor 28 and front wall 52 gradually increases from the upper end to the lower end thereof to provide a maximum efficiency in air flow. Fan means 10 is provided with baffle 58 positioned below the intake opening 50. Housing 28 is provided with a deflecting vane 59 pivotally connected to the lower rearward end 56 of front wall member 52 and a deflecting vane 61 pivotally connected to the rearward end of baffle 58 as illustrated in FIG. 3. Vanes 59 and 61 are interconnected by a linkage means 63 and the position of the vanes 59 and 61 is adjustably maintained through the use of a suitable assembly generally designated by the reference number 65 as illustrated in FIG. 3. Walls 34 and 36 and the rearward ends of vanes 59 and 61 define the discharge opening 60. Air intake opening 50 is defined between the upper end 54 of wall 52 and the forward end 62 of baffle 58.

The length of the arrows in FIG. 3 illustrate the air flow passing through the fan means 10 upon rotation of the rotor 28 by the shaft 30 and the length of the arrows is directly proportional to the amount of air flow. In other words, the longer the arrow, the greater the air flow. As seen in FIG. 3, the greatest volume of air is taken into the interior of housing 26 of fan means 10 at a point directly above the baffle 58 with a progressively smaller amount of air being taken into the housing 26 as upper end 54 of wall 52 is approached. Likewise, the greatest flow of air passing from opening 60 is adjacent the underside of the vane 61 while a smaller amount of air is discharged through opening 60 adjacent the top surface of vane 59.

Thus, as the combine 12 is moved along the ground so that the sickle bar assembly 20 cuts the standing crop 64, the air flowing from discharge opening 60 of fan means 10 will cause the crop to be bent over the sickle bar assembly 20 to aid in the cutting action thereof. The discharged air not only forces the crop 64 against the sickle bar assembly 20 to improve the cutting action thereof but also causes the crop to be moved rearwardly over the platform 16 and up into the thresher cylinder 21. The cutting efficiency of the combine is greatly increased by the air being discharged from the fan means 10 since the air flow will move the crop onto the platform whereas without the fan means, a certain amount of the crop would have fallen to the ground and been lost. The vanes 59 and 61 permit the discharged air to be precisely regulated for the various crops. The advantages of the vortex fan means provided herein over a conventional radial fan or the like are that a smaller fan may be used than otherwise possible so as to permit the operator to be able to clearly see the area forwardly of the header assembly. The vortex fan means of this invention also provides a constant air output across its length and provides discharged air with a high velocity to efficiently move the cut crop. The vortex fan described herein requires less power than conventional fans and can achieve the high air velocity with a single rotor whereas a conventional fan would require separate rotors and housing to even remotely compare with the efficiency of the fan means described herein. The fan means described herein also permits the platform auger and front elevator to be eliminated from the combine if so desired. The fan means also has a significant safety feature in that the front wall 52 acts as a shield to prevent anyone directly ahead of the machine from being injured as would be possible if a platform reel was being used. When the apparatus is being used to cut the heads from standing cereal crops, the vanes 59 and 61 would be regulated so that the air will be directed towards the sickle bar. When the apparatus is being used to cut soybeans or the like (low cutting) the vanes 59 and 61 would be regulated so that the air will be directed slightly above the sickle bar. The adjustment of the vanes 59 and 61 in both of the situations described above materially aids in the cutting action as well as elevating the crop to the threshing cylinder. The fan means disclosed herein also aids in keeping the platform clean due to the air being directed thereagainst. Thus it can be seen that the device accomplishes at least all of its stated objectives.

Some changes may be made in the construction and arrangement of my VORTEX FAN MEANS FOR A CROP GATHERING APPARATUS without departing from the real spirit and purpose of my invention, and it is my intention to cover by my claims, any modified forms of structure or use of mechanical equivalents which may be reasonably included within their scope.

I claim:

1. In combination:

a crop gathering device having a cutter assembly on the forward end thereof, said cutting assembly having opposite ends;

an elongated powered vortex fan secured to said crop gathering device and positioned fowardly and above said cutting assembly;

said vortex fan having a single elongated housing and single elongated rotor rotatably mounted within said housing, said housing and said rotor spanning the distance between said opposite ends of said cutting assembly;

said housing having an intake opening and a discharge opening facing towards said crop gathering device, said discharge opening being positioned below said intake opening and facing said cutting assembly;

said housing having a front wall extending around said rotor from said intake to said discharge opening, said front wall having upper and lower ends spaced from said rotor means, said space between said front wall and said rotor means increasing from said upper to said lower ends; whereby said fan will direct air downwardly and rearwardly towards said cutting assembly to cause a standing crop to be bent over said cutting assembly;

a pair of vanes hinged adjacent the margins of said discharge opening, said vanes being interconnected by mechanism for selectively moving said vanes in unison to vary the direction of the air exiting from said discharge opening.

* * * * *